United States Patent [19]

Marsden et al.

[11] Patent Number: 4,777,901
[45] Date of Patent: Oct. 18, 1988

[54] SECURITY MARKING FLUID DEVICE

[76] Inventors: Wayne M. Marsden, 22 Delph Mount; Warren L. Marsden, 38 St. Johns Street, both of Great Harwood, Lancashire, England

[21] Appl. No.: 7,667

[22] Filed: Jan. 28, 1987

[30] Foreign Application Priority Data

Jan. 28, 1986 [GB] United Kingdom ............... 8602086
Apr. 7, 1986 [GB] United Kingdom ............... 8608460

[51] Int. Cl.$^4$ .................... F16B 31/06; F16L 55/00
[52] U.S. Cl. .................... 116/211; 116/212; 116/206; 285/93; 411/13
[58] Field of Search ............ 116/264, 307, 206, 203, 116/212, 211; 324/110; 73/491, 762, ; 285/93; 411/13

[56] References Cited

U.S. PATENT DOCUMENTS

| | | | |
|---|---|---|---|
| 2,506,806 | 5/1950 | Metzger | 116/206 |
| 2,572,940 | 10/1951 | Lockhart | 116/203 |
| 2,601,840 | 7/1952 | Smith et al. | 116/206 |
| 3,463,532 | 8/1969 | Chidley et al. | 116/206 X |
| 3,799,108 | 3/1974 | Moscow | 411/13 |
| 3,964,299 | 6/1976 | Johnson | 73/762 X |
| 4,175,813 | 11/1979 | Mentesana | 324/110 X |
| 4,229,813 | 10/1980 | Lilly et al. | 116/206 X |
| 4,432,462 | 2/1984 | Newkirk | 116/266 X |

Primary Examiner—Daniel M. Yasich
Attorney, Agent, or Firm—Fisher, Christen & Sabol

[57] ABSTRACT

A security device for preventing or indicating the tampering with a joint in a supply pipe, e.g. to a gas meter, comprises two or more members which fit together around the joint. The members have mutually interdigitating parts through which a blind bore is provided and which houses a glass phial containing a dye. Displacement of the members from the assembled configuration breaks the phial, thereby releasing the dye which stains the members so that the tampering is readily detectable.

17 Claims, 1 Drawing Sheet

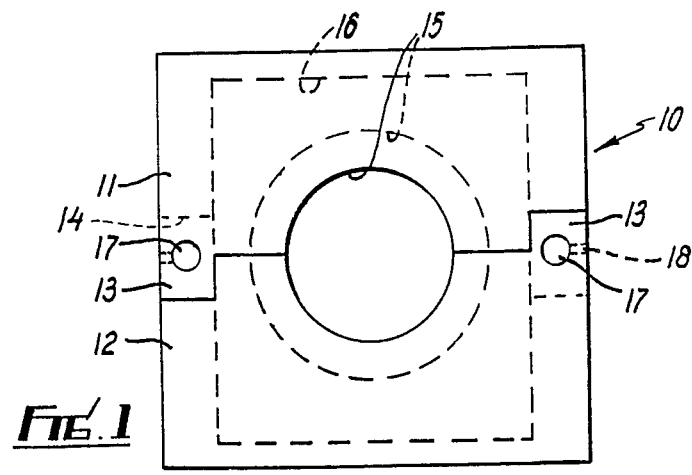
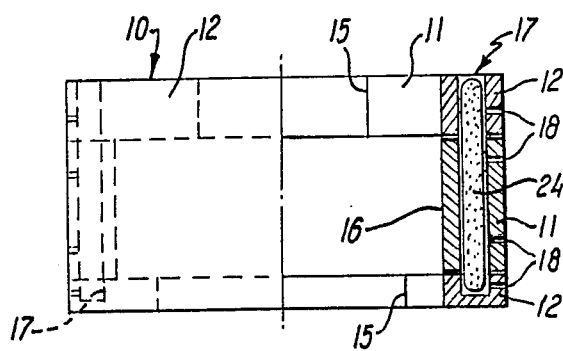
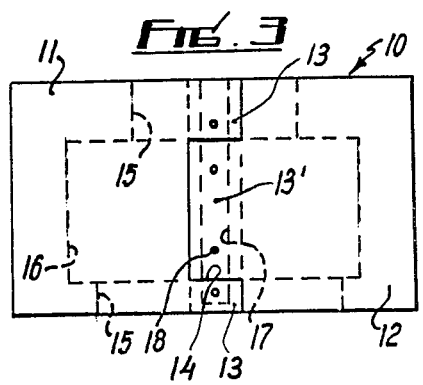
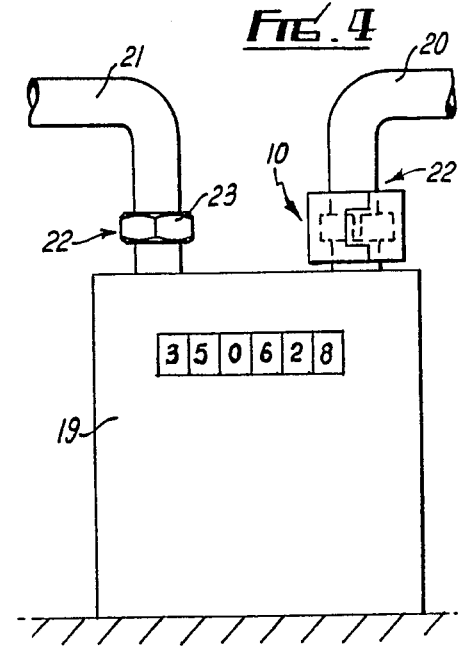

SECURITY MARKING FLUID DEVICE

The invention relates to security devices and in particular to devices for preventing, or at least indicating, the tampering with line supplies of fuel, power or the like. The invention has particular, but not exclusive, application to the prevention of undetectable tampering with the line supply of fuel or the like, for example gas.

It is an object of the present invention to provide a security device which is simple and cheap to manufacture, quick and simple to install requiring little technical skill or the use of sophisticated tools, but which is effective in preventing or at least detecting any tampering with the supply of a liquid or a gas to an appliance.

The invention provides a security device adapted to at least partially enclose a joint in a supply pipe, said device comprising a plurality of members and at least one container, said members having cooperating parts which are mutually overlapping when said members are in an assembled configuration, said parts of said members having recesses therein which are mutually aligned when said members are in said assembled configuration, said container being of a breakable material and having a marking fluid therein and being adapted to be received in said aligned recesses whereby displacement of said members from said assembled configuration causes said container to break and release said marking fluid so as to stain said members.

The device may comprise two members which may be of a porous material, for example a porous plastics material. Each member may have a plurality of parts which interdigitate with the parts of the other member or members when said members are in said assembled configuration.

Said container may be of glass or a plastics material and said marking fluid may be a coloured dye.

One embodiment of security device in accordance with the invention will now be described with reference to the accompanying drawings, in which:

FIG. 1 is a plan view,
FIG. 2 is a front view,
FIG. 3 is a side view, and
FIG. 4 is front view of the device in situ adjacent a gas meter.

Referring now to FIGS. 1 to 4 there is shown a security device 10 comprising two substantially identical members 11,12. The members 11,12 are injection moulded of a cheap porous plastics material, only one mould being necessary to produce the two members 11,12. Each member 11,12 has a plurality of protruding parts 13, 13' two parts 13 being provided per side in the embodiment shown although any other number may be provided if desired. The protruding parts 13 are spaced by recesses 14 adapted to receive the protruding parts 13' of the other member, so that the two members 11,12 fit together, one inverted relative to the other, with the protruding parts 13 and 13' interdigitating as shown particularly in FIG. 3. Semi-circular recesses 15,16 are provided in each member 11,12 so that when the two members 11,12 are in the assembled configuration the recess 15 in member 11 and the recess 15 in member 12 form a through bore in the device 10 and similarly the recesses 16 form an annular recess substantially centrally of the device 10.

When the members 11,12 are in the assembled configuration a blind bore 17 is drilled through each set of interdigitating parts 13. Apertures 18 are provided, communicating with the bores 17.

The safety device 10 is used as follows, reference being made to FIG. 4. A gas meter 19 has a gas inlet pipe 20 and a gas outlet pipe 21 coupled to it at joints 22. Each joint 22 incorporates a nut 23. To prevent the nuts 23 being undone so as to uncouple the inlet and outlet pipes 20,21 from the gas meter 19 in an attempt to either by-pass the meter 19 or reverse its direction of operation, a safety device 10 is placed around one or each joint 22. In FIG. 4 a device 10 is shown in situ at the joint 22 of the inlet pipe 20. The pipe 20 is received in the through the bore formed by the recesses 15 in the two members 11,12 when they are assembled around the joint 22, and the nut 23 is received in the recesses 16. The protruding parts 13 of the members 11,12 interdigitate as previously described, thereby allowing a dye-containing glass phial 24 (see FIG. 2) to be pushed into each blind bore 17. The phials 24 are of length slightly less than the length of the bores 17 so that they are completely housed therein and cannot be withdrawn once they have been inserted. The device 10 is now in its assembled operational configuration, and such assembly is quick and simple and does not involve the use of sophisticated tools or any technical knowledge on the part of the person assembling the device 10. It may be placed in situ by the meter reader and inspected at each meter reading.

Once in position the device 10 cannot be removed without breaking the glass phials 24, thereby releasing the indelible dye therefrom. The dye will seep into the porous plastics material of the members 11,12, and also run out of the apertures 18 to stain the outside of the members 11,12. In consequence, any attempt to tamper with the gas meter 19 and the inlet and/or outlet pipes 20,21 can be detected since the device 10 will either not be present or will be stained if replaced.

Although the device 10 is described in relation to its use with a gas supply, it may be used in other circumstances for example with liquid fuel supply lines or in chemical plants. In the latter case the device may be regarded purely as a safety device whereas in the cases of gas or liquid fuel the device is both a safety and a theft prevention security device. In either case the deterrent effect can serve to prevent accidents caused by tampering with equipment by unauthorised and unskilled persons.

Other configurations of the members 11,12 will be readily apparent to persons skilled in the art. For example two members may be hingedly attached to each other at one side of the device 10 and have a single phial 24 housed in a recess 17 provided in the mutually overlapping part 13 of the members at the opposed side of the device 10. Alternatively more than two members may be provided which fit together and house one or more breakable phials in bores passing through at least two of the members. The phials may be of any readily breakable material such as a plastics material if desired.

When assembled, the device 10 should preferably be a loose fit around the nut 23 so as to preclude any possibility of the nut 23 being turned by turning the device 10.

As a further safeguard, since the nut 23 is not visible or accessible when the device 10 is fitted, at least a part of the device 10 may be of a material which reacts on contact with the fluid passing through the pipe 20 so as to change colour and indicate any leakage of fluid from the joint 22.

We claim:

1. A security device adapted to at least partially enclose a joint in a supply pipe, said device comprising a plurality of members and at least one container, said members having cooperating parts which are mutually overlapping when said members are in an assembled configuration, said parts of each of said members having a recess therein which is mutually aligned with the recess in the another member when said members are in said assembled configuration, said container being of a breakable material and having a marking fluid therein, and being adapted to be received in said aligned recesses whereby displacement of said members from said assembled configuration causes said container to break and release said marking fluid so as to stain said members.

2. A security device according to claim 1 comprising two members.

3. A security device according to claim 2 wherein said members are of substantially like form.

4. A security device according to claim 1 wherein said members are of a porous material.

5. A security device according to claim 4, wherein said members are of a porous plastics material.

6. A security device according to claim 1 wherein each of said members has a plurality of parts which interdigitate with the parts of another member when said members are in said assembled configuration.

7. A security device according to claim 1, wherein said container is of glass.

8. A security device according to claim 1, wherein said container is of plastics material.

9. A security device according to claim 1, wherein said marking fluid is a coloured dye.

10. A security device according to claim 1, wherein each member has a recess therein which forms with the recess in another member a through bore in said device when said members are in said assembled configuration.

11. A security device according to claim 10, wherein each member has a second recess therein which forms with the second recess in another member an annular recess disposed substantially centrally of said device when said members are in said assembled configuration.

12. A security device according to claim 1, wherein said aligned recesses form a blind bore.

13. A security device according to claim 12 wherein a plurality of apertures are provided in a side of said device, which apertures communicate with said blind bore.

14. A security device according to claim 12, wherein said blind bore has a length greater than that of said container.

15. A security device according to claim 1, having opposed sides and comprising two members which are hingedly secured to each other at one side of said device and have a container housed in said aligned recesses provided in the mutually overlapping parts of said members at the opposed side of said device.

16. A security device according to claim 1, wherein said device has at least a part thereof of a material which reacts so as to change colour on contact with a fluid passing through said supply pipe so as to indicate leakage of said fluid from said pipe.

17. A security device adapted to at least partially enclose a joint in a supply pipe, said device comprising a plurality of members and at least one container, said members having cooperating parts which are mutually overlapping when said members are in an assembled configuration, said parts of each of said members having a recess therein which is mutually aligned with the recess in the another member when said members are in said assembled configuration, said recesses form a blind bore which has a length greater than that of said container said container being of a breakable material and having a marking fluid therein, and being adapted to be received in said aligned recesses whereby displacement of said members from said assembled configuration causes said container to break and release said marking fluid so as to stain said members.

* * * * *